US010107149B2

United States Patent
Manther et al.

(10) Patent No.: US 10,107,149 B2
(45) Date of Patent: *Oct. 23, 2018

(54) MULTI-POSITION CAMSHAFT PHASER WITH TWO ONE-WAY WEDGE CLUTCHES

(71) Applicant: Schaeffler Technologies AG & Co. KG, Herzogenaurach (DE)

(72) Inventors: Debora Manther, Royal Oak, MI (US); Simon Xunnan He, Troy, MI (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 182 days.

This patent is subject to a terminal disclaimer.

(21) Appl. No.: 14/700,968

(22) Filed: Apr. 30, 2015

(65) Prior Publication Data

US 2016/0319712 A1    Nov. 3, 2016

(51) Int. Cl.
*F01L 1/34* (2006.01)
*F01L 1/344* (2006.01)

(52) U.S. Cl.
CPC .......... *F01L 1/34409* (2013.01); *F01L 1/344* (2013.01); *F01L 1/3442* (2013.01)

(58) Field of Classification Search
CPC ...... F01L 1/3442; F01L 1/344; F01L 1/34409
USPC .......................................... 123/90.15, 90.17
See application file for complete search history.

(56) References Cited

U.S. PATENT DOCUMENTS

| | | | | |
|---|---|---|---|---|
| 6,257,186 B1* | 7/2001 | Heer | ................... | F01L 1/024 |
| | | | | 123/90.17 |
| 9,422,837 B2* | 8/2016 | Hemphill | ........... | F01L 1/34409 |
| | | | | 123/90.17 |
| 9,447,709 B1* | 9/2016 | Manther | ............ | F01L 1/34409 |
| | | | | 123/90.17 |
| 9,464,675 B1* | 10/2016 | He | ...................... | F16D 25/062 |
| | | | | 123/90.17 |
| 9,879,573 B2* | 1/2018 | Manther | ............... | F01L 1/3442 |
| | | | | 123/90.17 |
| 9,896,976 B2* | 2/2018 | Shewell | .................. | F01L 1/344 |
| | | | | 123/90.17 |

OTHER PUBLICATIONS

U.S. Appl. No. 14/686,478, filed Apr. 14, 2015.
U.S. Appl. No. 62/032,079, filed Aug. 1, 2014.

* cited by examiner

*Primary Examiner* — Ching Chang

(57) ABSTRACT

A camshaft phaser, including: a rotatable stator; a rotatable rotor arranged to be non-rotatably connected to a camshaft; first and second wedge plates radially disposed between the rotor and the stator; and a displacement assembly arranged to, for an advance mode, displace the first wedge plate in a first circumferential direction to enable rotation of the rotor, with respect to the stator, in the first circumferential direction, and for a retard mode, displace the second wedge plate in a second circumferential direction, opposite the first circumferential direction, to enable rotation of the rotor, with respect to the stator, in the second circumferential direction.

20 Claims, 13 Drawing Sheets

MULTI-POSITION CAMSHAFT PHASER WITH TWO ONE-WAY WEDGE CLUTCHES

TECHNICAL FIELD

The present disclosure relates to a multi-position camshaft phaser with two one-way wedge clutches. In particular, the two one-way wedge clutches are used to advance and retard the phase of the rotor with respect to the stator.

BACKGROUND

It is known to use fluid pressure in chambers created by respective portions of a stator and a rotor for a camshaft phaser to maintain and shift a rotational position of the rotor with respect to the stator. This known technique involves complicated hydraulic systems and controls.

SUMMARY

According to aspects illustrated herein, there is provided a camshaft phaser, including:
a stator arranged to receive torque from an engine; a rotor arranged to be non-rotatably connected to a camshaft; first and second wedge plates radially disposed between the rotor and the stator; and a displacement assembly arranged to for an advance mode, displace the first wedge plate in a first circumferential direction to enable rotation of the rotor, with respect to the stator, in the first circumferential direction, and for a retard mode, displace the second wedge plate in a second circumferential direction, opposite the first circumferential direction, to enable rotation of the rotor, with respect to the stator, in the second circumferential direction.

According to aspects illustrated herein, there is provided a camshaft assembly, including: a stator arranged to receive torque from an engine; a rotor arranged to be non-rotatably connected to a camshaft; first and second wedge plates radially disposed between the rotor and the stator; and a displacement assembly including a first and second resilient elements and first and second pins. For an advance mode: the second resilient element is arranged to displace to displace the second wedge plate in a first circumferential direction to block rotation of the rotor, with respect to the stator, in a second circumferential direction, opposite the first circumferential direction; and the first pin is arranged a displace the first wedge plate in the first circumferential direction to enable rotation of the rotor, with respect to the stator, in the first circumferential direction. For a retard mode: the second resilient element is arranged to displace to displace the first wedge plate in the second circumferential direction to block rotation of the rotor, with respect to the stator, in the first circumferential direction; and the second pin is arranged a displace the second wedge plate in the second circumferential direction to enable rotation of the rotor, with respect to the stator, in the second circumferential direction.

According to aspects illustrated herein, there is provided a method of fabricating a camshaft, including: fabricating a rotor including a core portion, a central opening through which an axis of rotation for the camshaft phaser passes, first and second chambers, a first channel connecting the central opening and the first chamber and a second channel connecting the central opening and the second chamber; installing the rotor within a stator including an input gear; installing a first wedge plate, including a third plurality of ramps, radially between the rotor and the stator; engaging the first plurality of ramps with the third plurality of ramps; installing a second wedge plate, including a fourth plurality of ramps, radially between the rotor and the stator; engaging the second plurality of ramps with the fourth plurality of ramps; installing a first resilient element between a first circumferential end of the first wedge plate and the rotor, the first resilient element urging the first wedge plate in a first circumferential direction; installing a second resilient element between a second circumferential end of the second wedge plate and the rotor, the second resilient element urging the second wedge plate in a second circumferential direction opposite the first circumferential direction; installing a first pin in the first chamber; and installing a second pin in the second chamber. The first channel and chamber are arranged to receive pressurized fluid to displace the first pin in a first circumferential direction. The second channel and chamber are arranged to receive pressurized fluid to displace the second pin in a second circumferential direction, opposite the first circumferential direction.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Unless defined otherwise, all technical and scientific terms used herein have the same meaning as commonly understood to one of ordinary skill in the art to which this present disclosure belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims.

Figure 1:
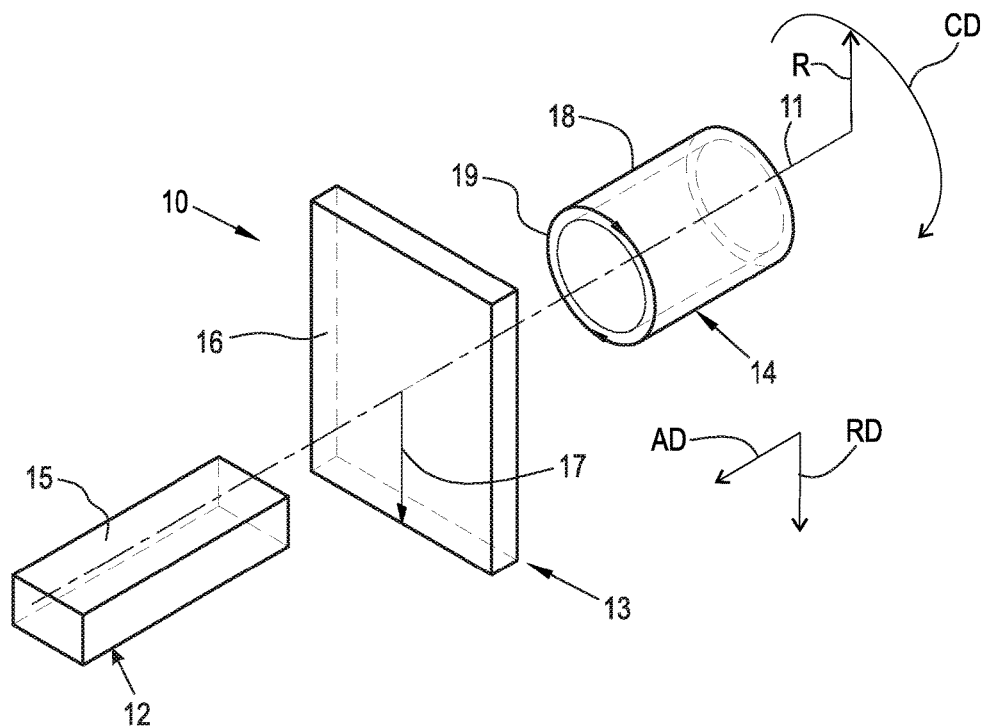
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
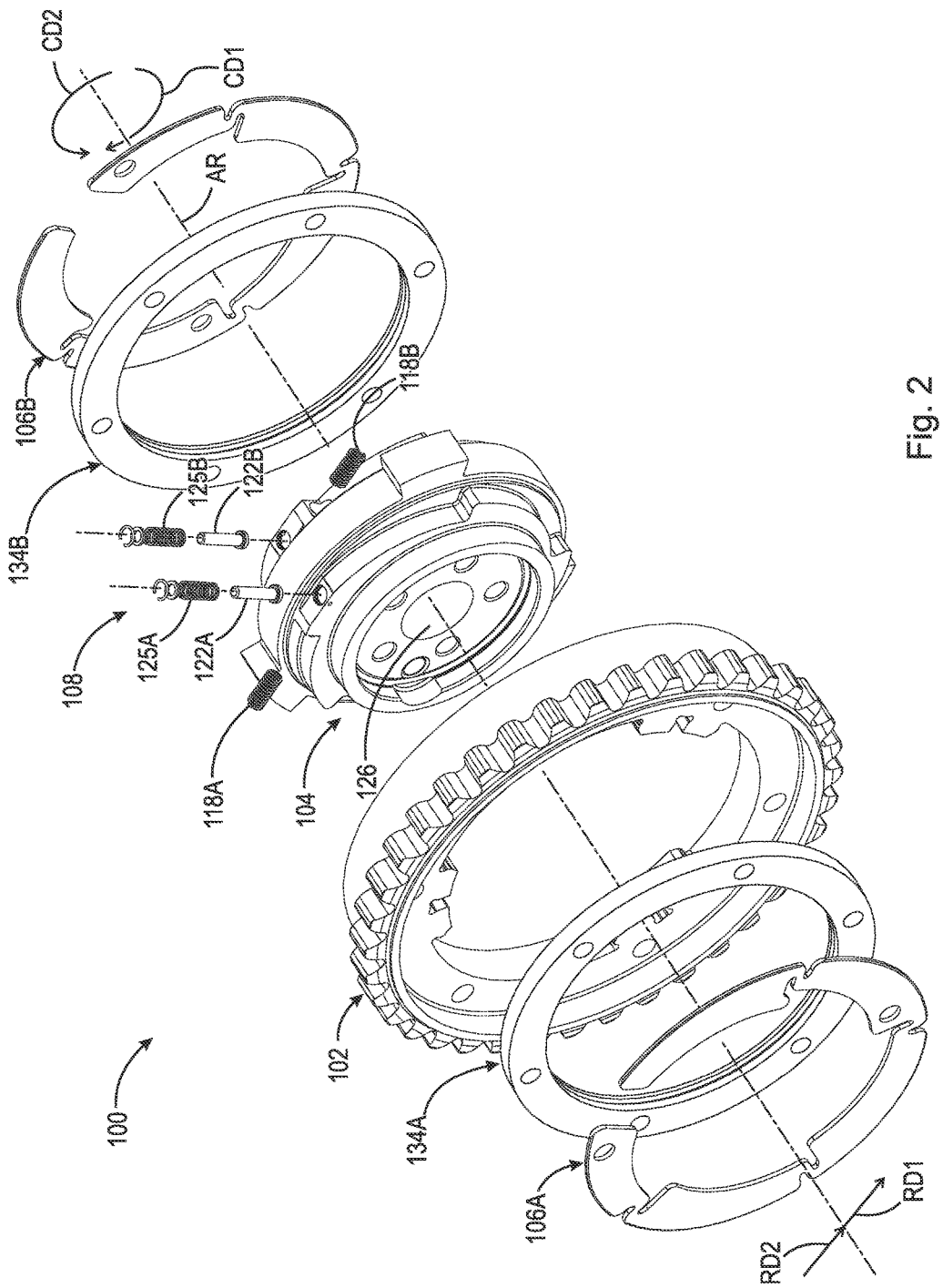
FIG. 2 is a perspective exploded view of a camshaft phaser with two-way wedge clutches and radially displacing pins.

FIG. 2 is a perspective exploded view of camshaft phaser 100 with two-way wedge clutches and radially displacing pins.

Figure 3:
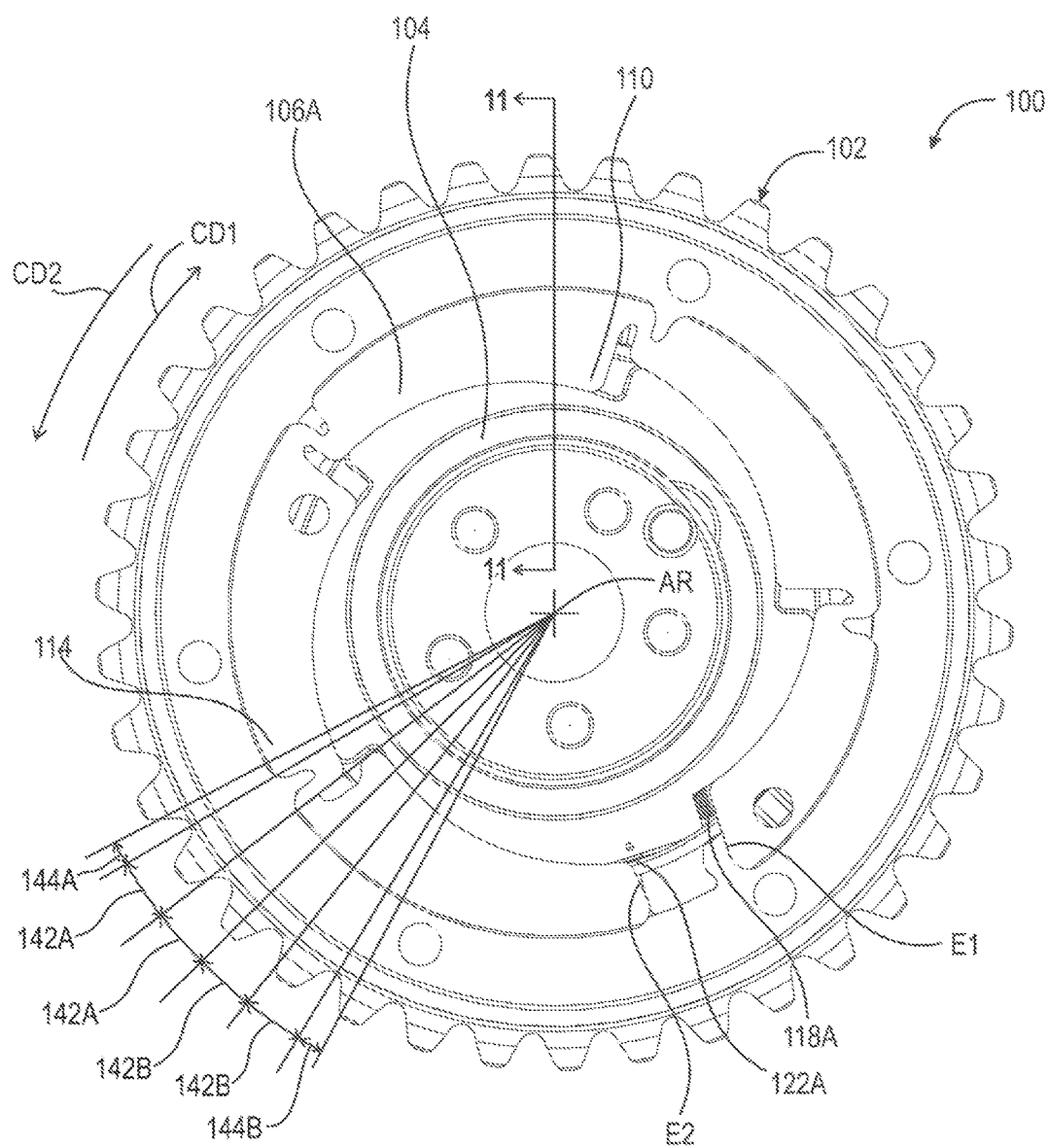
FIG. 3 is a front view of the camshaft phaser in FIG. 2.

FIG. 3 is a front view of camshaft phaser 100 in FIG. 2.

Figure 4:
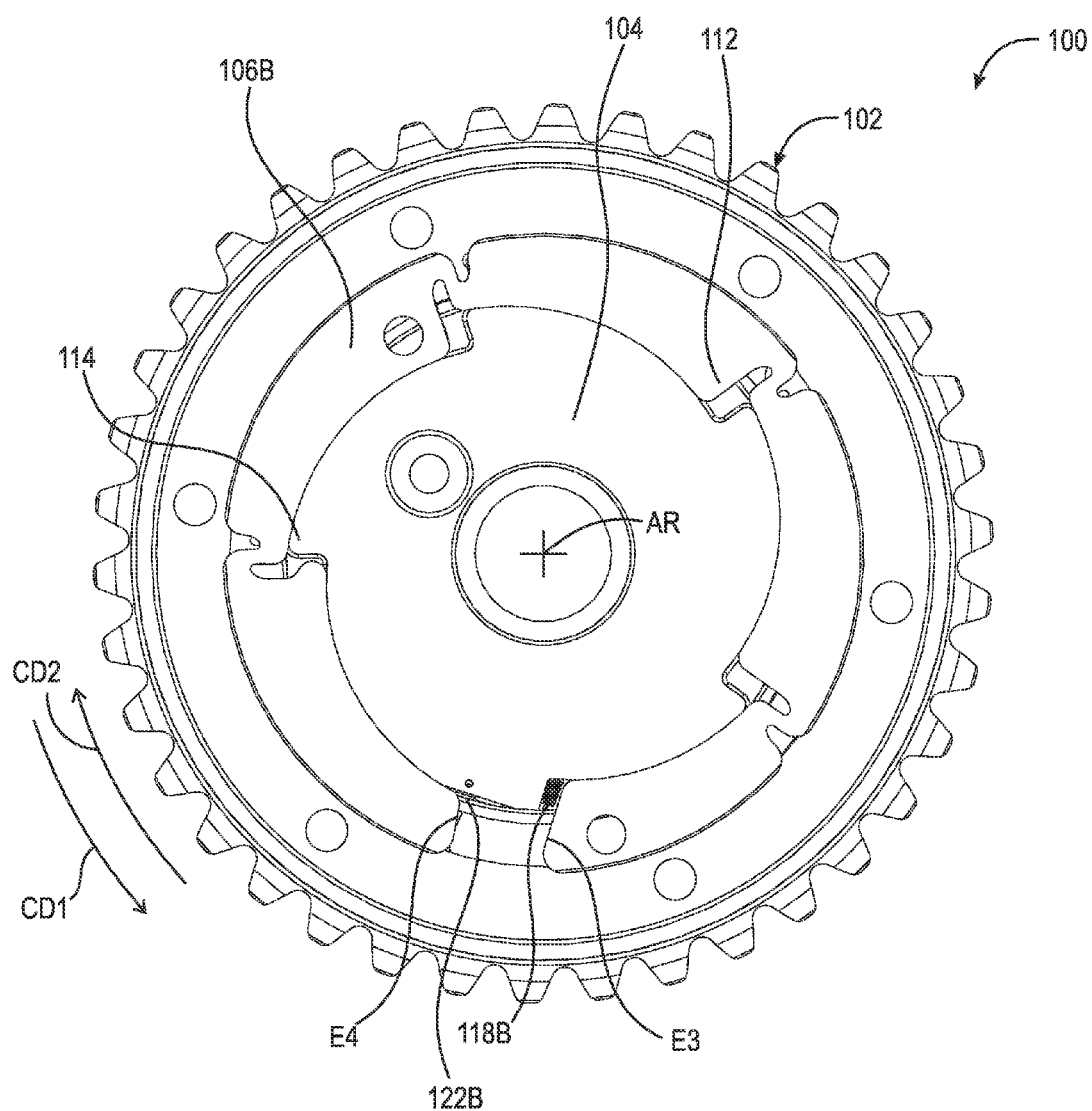
FIG. 4 is a rear view of the camshaft phaser in FIG. 2.

FIG. 4 is a rear view of camshaft phaser 100 in FIG. 2. The following should be viewed in light of FIGS. 2 through 5. Camshaft phaser 100 includes axis of rotation AR, rotatable stator 102 arranged to receive torque from an engine, rotatable rotor 104 arranged to be non-rotatably connected to a camshaft; wedge plates 106A and 106B radially disposed between the rotor and the stator; and displacement assembly 108. For an advance mode of phaser 100, assembly 108 is arranged to displace wedge plate 106A in a circumferential direction CD1 to enable rotation of rotor 104, with respect to stator 102, in circumferential direction CD1. For a retard mode of phaser 100, assembly 108 is arranged to displace wedge plate 106B in circumferential direction CD2, opposite circumferential direction CD1, to enable rotation of rotor 104, with respect to stator 102, in the circumferential direction CD2.

Figure 5:
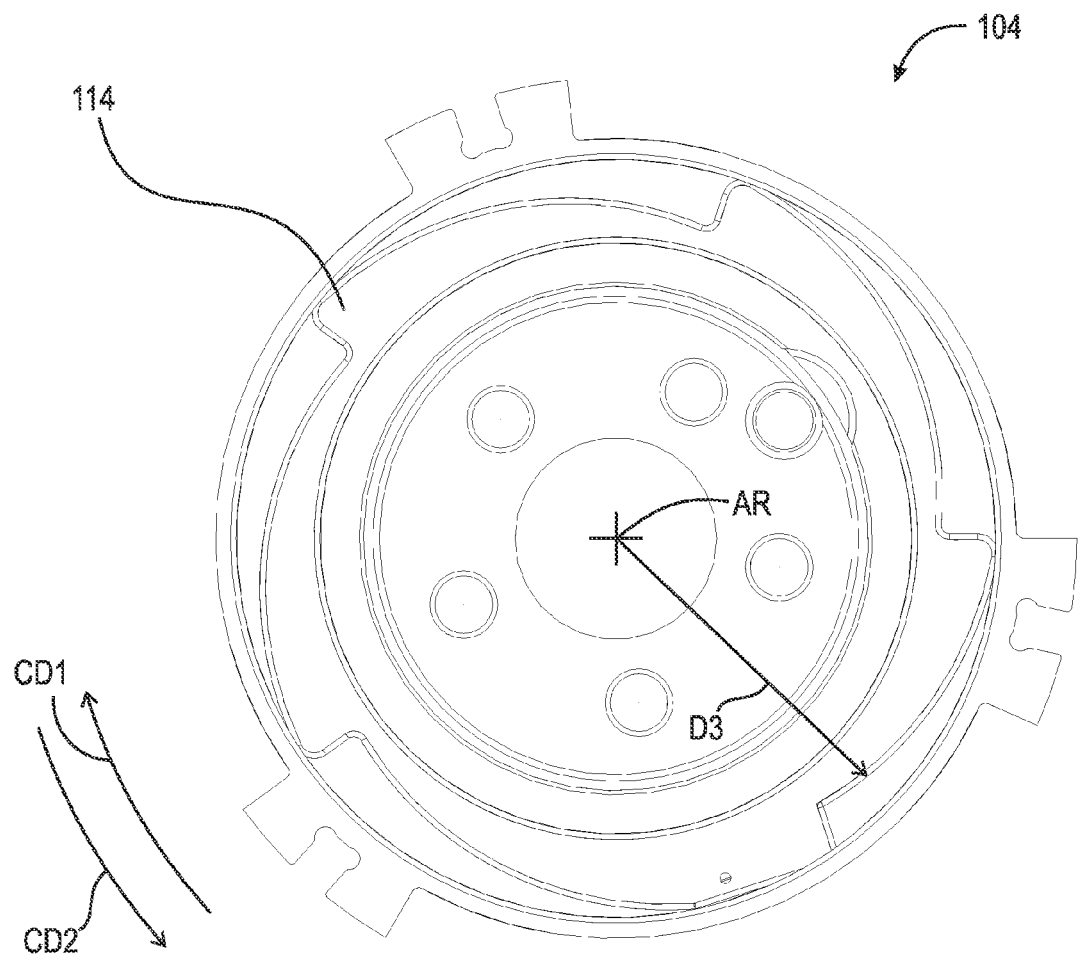
FIG. 5 is a front view of the rotor in FIG. 3.
Figure 6:
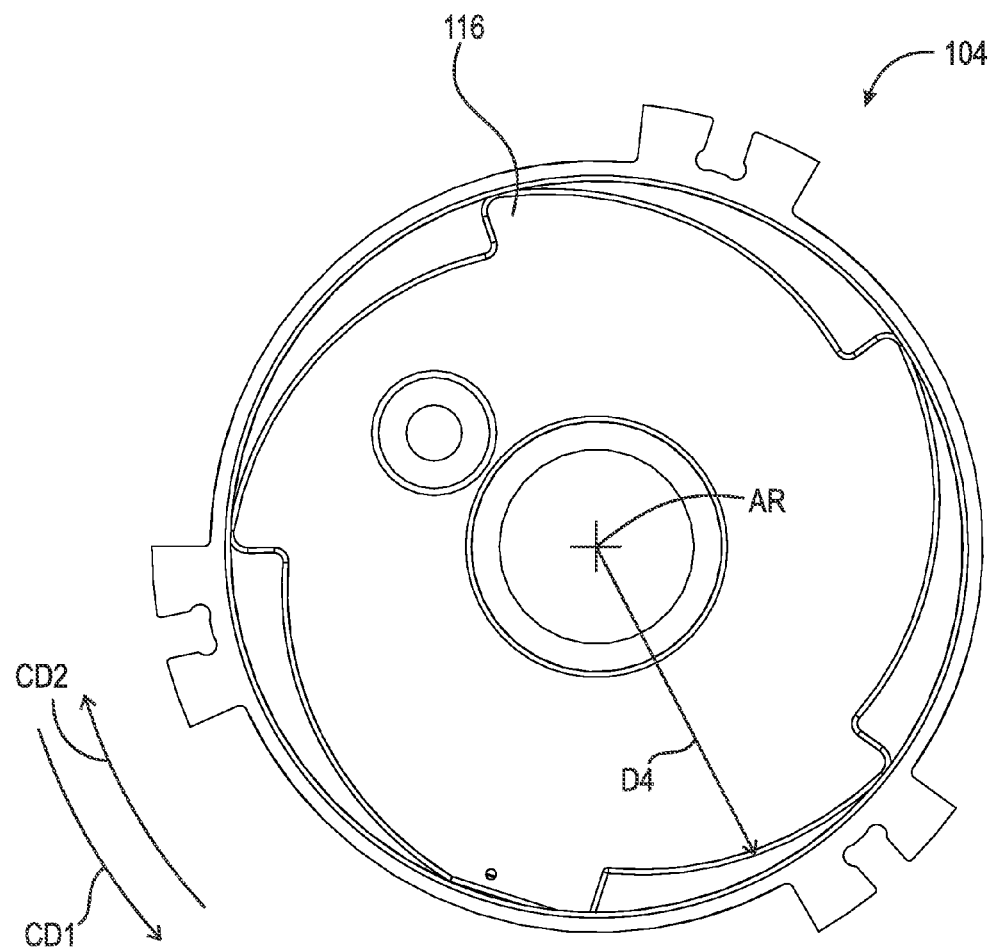
FIG. 6 is a rear view of the rotor in FIG. 4.
Figure 7:
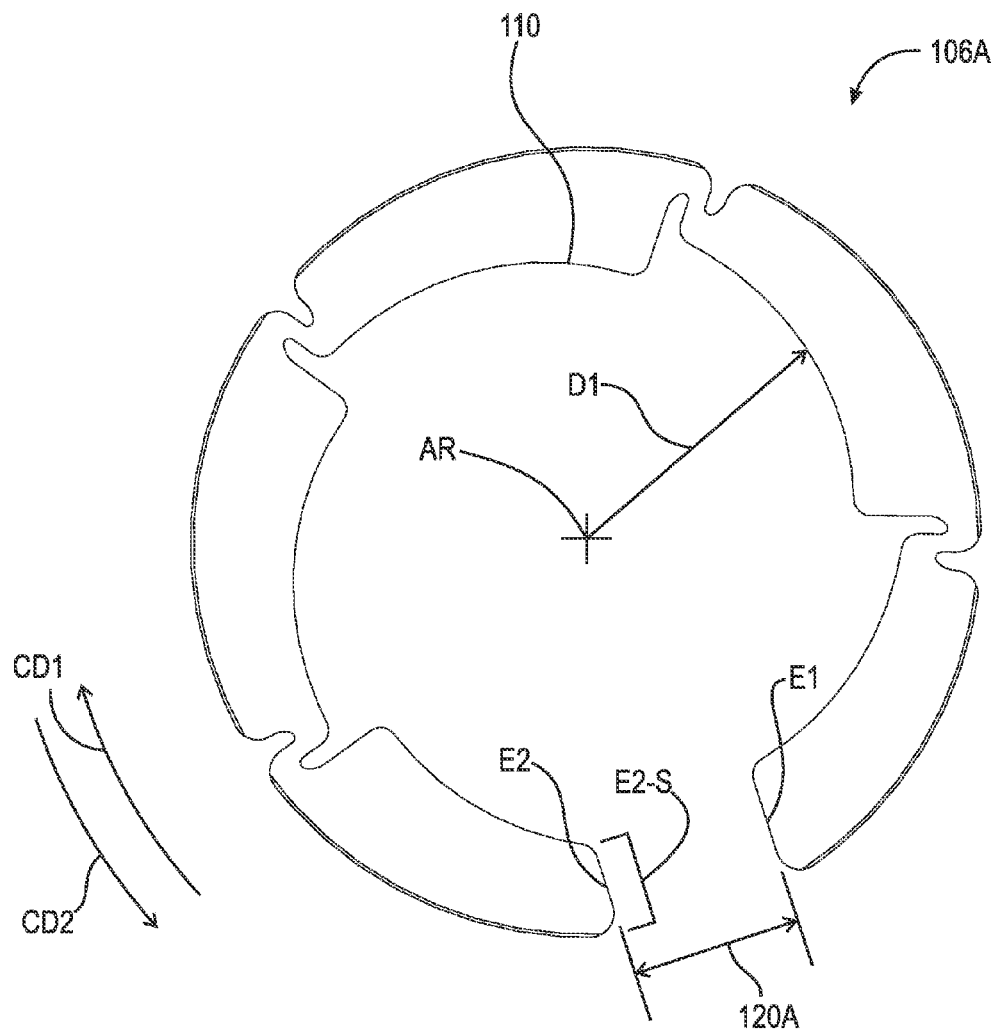
FIG. 7 is a front view of the wedge plate in FIG. 3.
Figure 8:
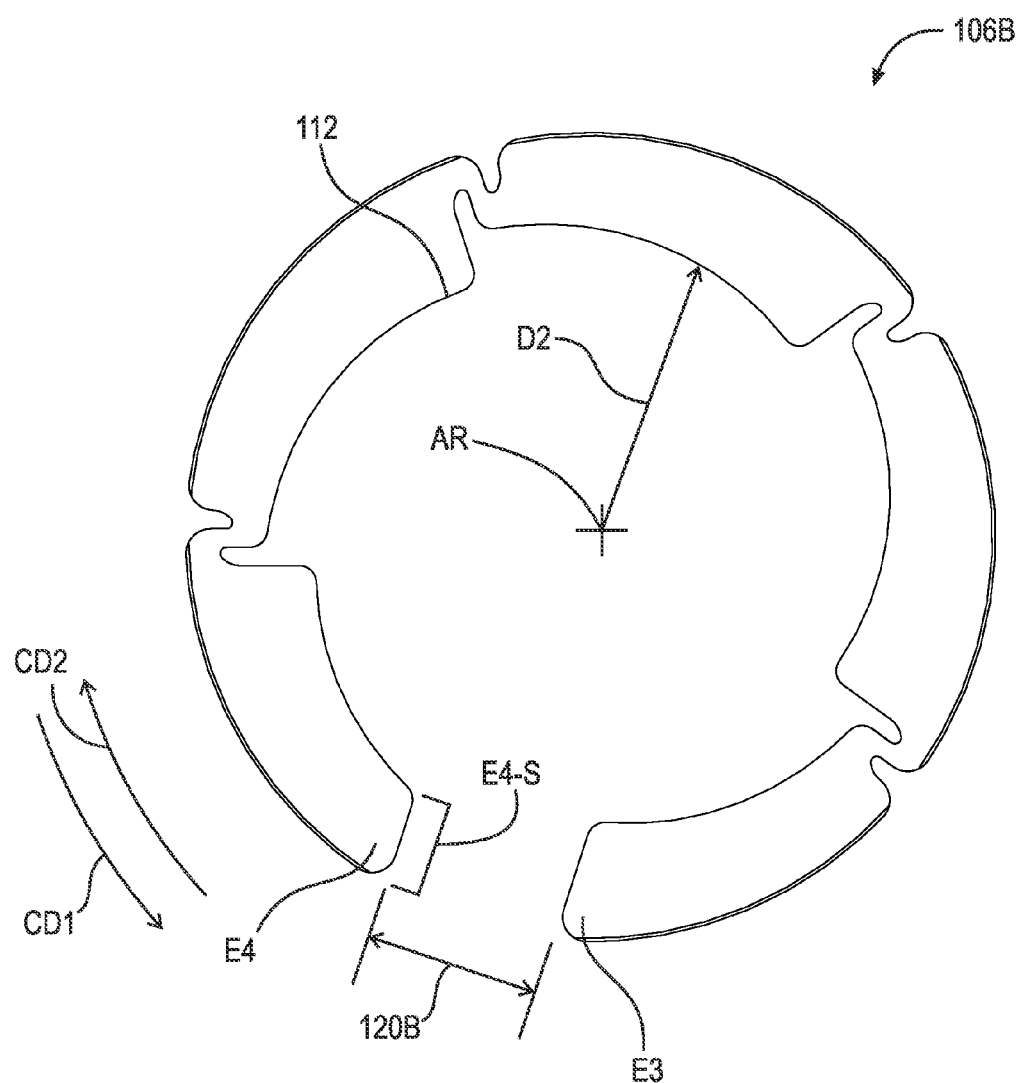
FIG. 8 is a rear view of the wedge plate in FIG. 4.

FIG. 5 is a front view of the rotor in FIG. 3.
FIG. 6 is a rear view of the rotor in FIG. 4.
FIG. 7 is a front view of the wedge plate in FIG. 3.
FIG. 8 is a rear view of the wedge plate in FIG. 4. The following should be viewed in light of FIGS. 2 through 8. For the advance mode, displacement assembly 108 is arranged to displace wedge plate 106B in circumferential direction CD1 to block rotation of rotor 104, with respect to stator 102, in circumferential direction CD2. For the retard mode, displacement assembly 108 is arranged to displace wedge plate 106A in circumferential direction CD2 to block rotation of rotor 104, with respect to stator 102, in circumferential direction CD1.

For the advance mode, displacement assembly 108 is arranged to non-rotatably connect rotor 104, the wedge plate 106B, and stator 102 for rotation of rotor 104, with respect to stator 102, in circumferential direction CD2. For the retard mode, displacement assembly 108 is arranged to non-rotatably connect rotor 104, wedge plate 106A, and stator 102 for rotation of rotor 104, with respect to the stator, in circumferential direction CD1.

Wedge plates 106A and 106B includes ramps 110 and 112, respectively. Rotor 104 includes ramps 114 and 116, respectively, engaged with ramps 110 and 112, respectively. Radial distance D1 of ramps 110 decreases in direction CD1 and increases in direction CD2. That is, ramps 110 slope radially inward in direction CD1 and radially outward in direction CD2. Radial distance D2 of ramps 112 decreases in direction CD2 and increases in direction CD1. That is, ramps 112 slope radially inward in direction CD2 and radially outward in direction CD1. Radial distance D3 of ramps 114 decreases in direction CD1 and increases in direction CD2. That is, ramps 114 slope radially inward in direction CD1 and radially outward in direction CD2. Radial distance D4 of ramps 116 decreases in direction CD2 and increases in direction CD1. That is, ramps 116 slope radially inward in direction CD2 and radially outward in direction CD1.

For the advance mode: ramps 114 are arranged to slide along ramps 110 in circumferential direction CD1; and displacement assembly 108 is arranged to slide ramps 116 along ramps 112 in circumferential direction CD1. Thus, since ramps 110 and 114 both slope radially inward in direction CD1, ramps 114 do not displace wedge plate 106A radially outward and rotor 104 is able to rotate with respect to the stator in direction CD1.

For the retard mode: ramps 114 are arranged to slide along ramps 116 in circumferential direction CD2; and displacement assembly 108 is arranged to slide ramps 110 along ramps 114 in circumferential direction CD2. Thus, since ramps 112 and 116 both slope radially inward in direction CD2, ramps 116 do not displace wedge plate 106B radially outward and rotor 104 is able to rotate with respect to the stator in direction CD2.

Figure 9:
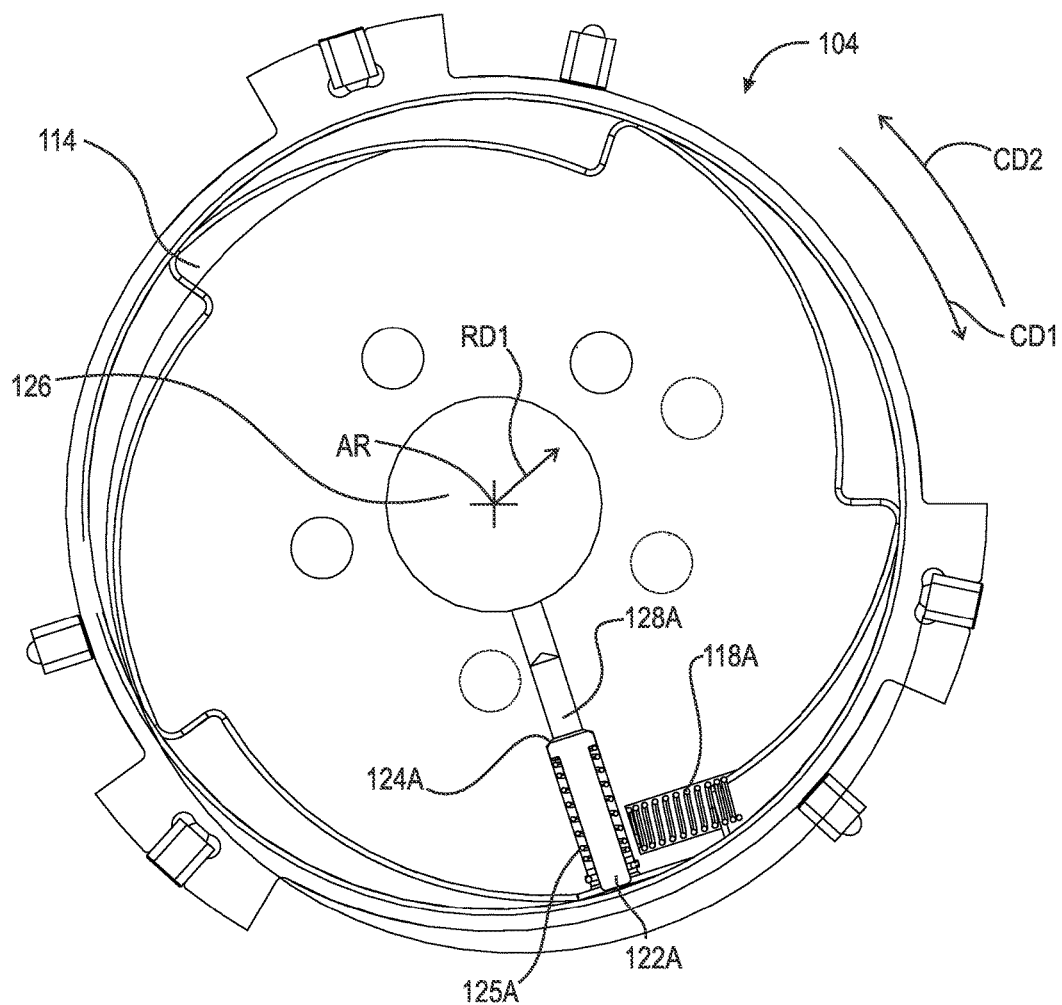
FIG. 9 is a cross-sectional view of the rotor in FIG. 3 along a plane orthogonal to an axis of rotation.

FIG. 9 is a cross-sectional view of the rotor in FIG. 3 along a plane orthogonal to an axis of rotation.

Figure 10:
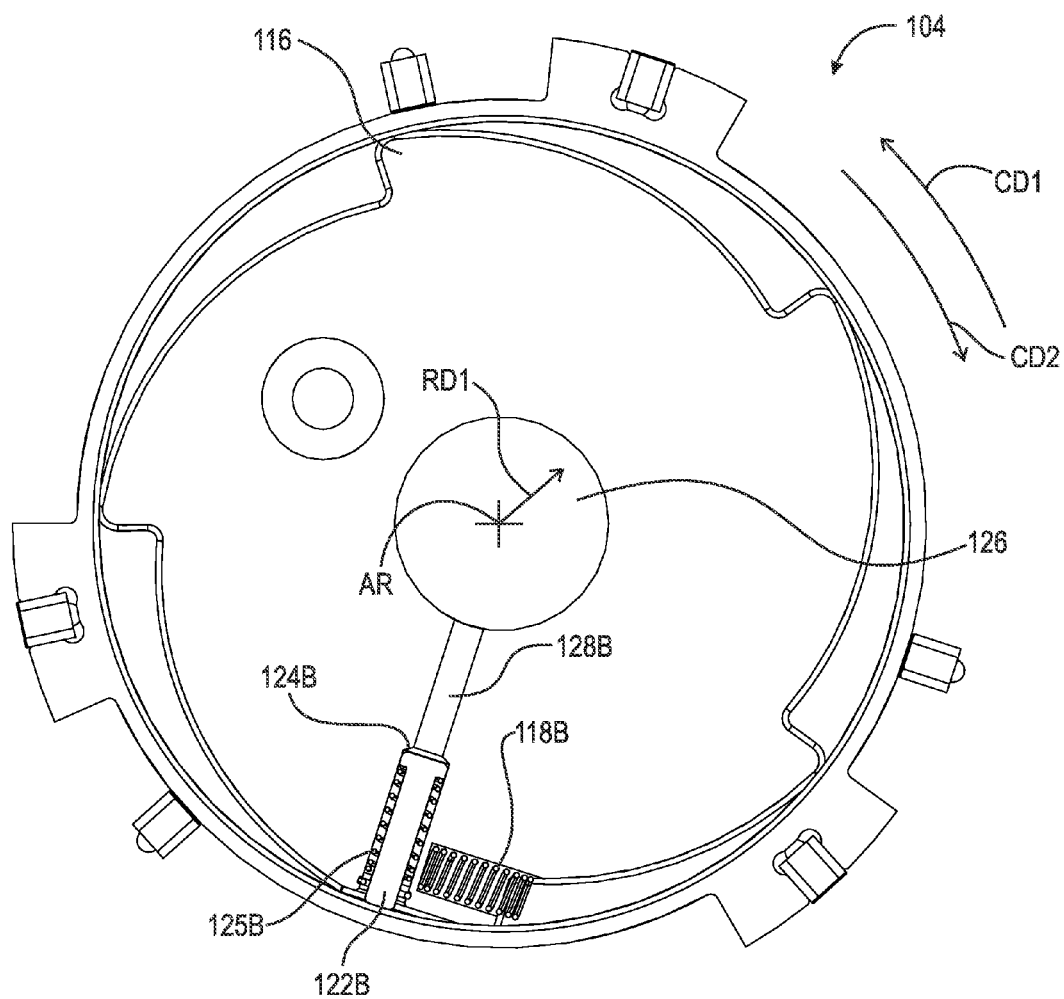
FIG. 10 is a cross-sectional view of the rotor in FIG. 4 along a plane orthogonal to the axis of rotation.

FIG. 10 is a cross-sectional view of the rotor in FIG. 4 along a plane orthogonal to the axis of rotation. The following should be viewed in light of FIGS. 2 through 10. In an example embodiment, displacement assembly 108 includes resilient elements 118A and 118B. Resilient element 118A is circumferentially disposed between rotor 104 and wedge plate 106A and is arranged to displace wedge plate 106A in circumferential direction CD2 with respect to the rotor. Resilient element 118B is circumferentially disposed between rotor 104 and wedge plate 106B and is arranged to displace wedge plate 106B in circumferential direction CD1 with respect to the rotor. For the advance mode, resilient element 118B is arranged to displace wedge plate 106B in circumferential direction CD1 to block rotation of rotor 104, with respect to stator 102, circumferential direction CD2 and eliminate back lash. For the retard mode, resilient element 118A is arranged to displace wedge plate 106A in circumferential direction CD2 to block rotation of rotor 104, with respect to stator 102, circumferential direction CD1 and eliminate back lash.

In an example embodiment: wedge plate 106A includes circumferential ends E1 and E2 separated by gap 120A in circumferential direction CD1; and wedge plate 106B includes circumferential ends E3 and E4 separated by gap 120B in circumferential direction CD1. Resilient elements 118A and 118B are engaged with circumferential ends E1 and E3, respectively.

In an example embodiment, displacement assembly 108 includes pins 122A and 122B in chambers 124A and 124B, respectively, in rotor 104. Pins 122A and 122B are at least partially located in chambers 124A and 124B, respectively. Springs 125A and 125B, respectively, urge pins 122A and 122B in radially inward direction RD2. Further, rotor 104 includes: central opening 126 through which axis of rotation AR for camshaft phaser 100 passes. Assembly 108 includes: channel 128A in rotor 104 connecting opening 126 and chamber 124A; and channel 128B in rotor 104 connecting opening 126 and 124B. Channels 128A and 128B are arranged to receive pressurized fluid. For the advance mode, the pressurized fluid is arranged to displace pin 122A in radially outward direction RD1 to displace end 106A in circumferential direction CD1. For the retard mode, the pressurized fluid is arranged to displace pin 122B in radially outward direction RD1 to displace end 108A in circumferential direction CD2. Springs 125A and 125B urge pins out of contact with ends E2 and E4, respectively, in the absence of pressurized fluid in channels 128A and 128B. Thus, in the absence of the pressurized fluid, pins 122A and 122B do not interfere with rotation of wedge plates 106A and 106B, respectively.

In an example embodiment, ends E2 and E4 include slopes, or sloped portions, E2-S and E4-S, respectively. In an example embodiment, sloped portions E2-S and E4-S include all of E2-S and E4-S, respectively. Along radially outward direction RD1, slope E2-S extends further in circumferential direction CD2. Along radially outward direction RD1, slope E4-S extends further in circumferential direction CD1. Thus: as pin 122A extends in direction RD1, pin 122A slides along slope E2-S, pushing wedge plate 106A in direction CD1; as pin 122B extends in direction RD1, pin 122B slides along slope E4-S, pushing wedge plate 106B in direction CD2.

Figure 11:
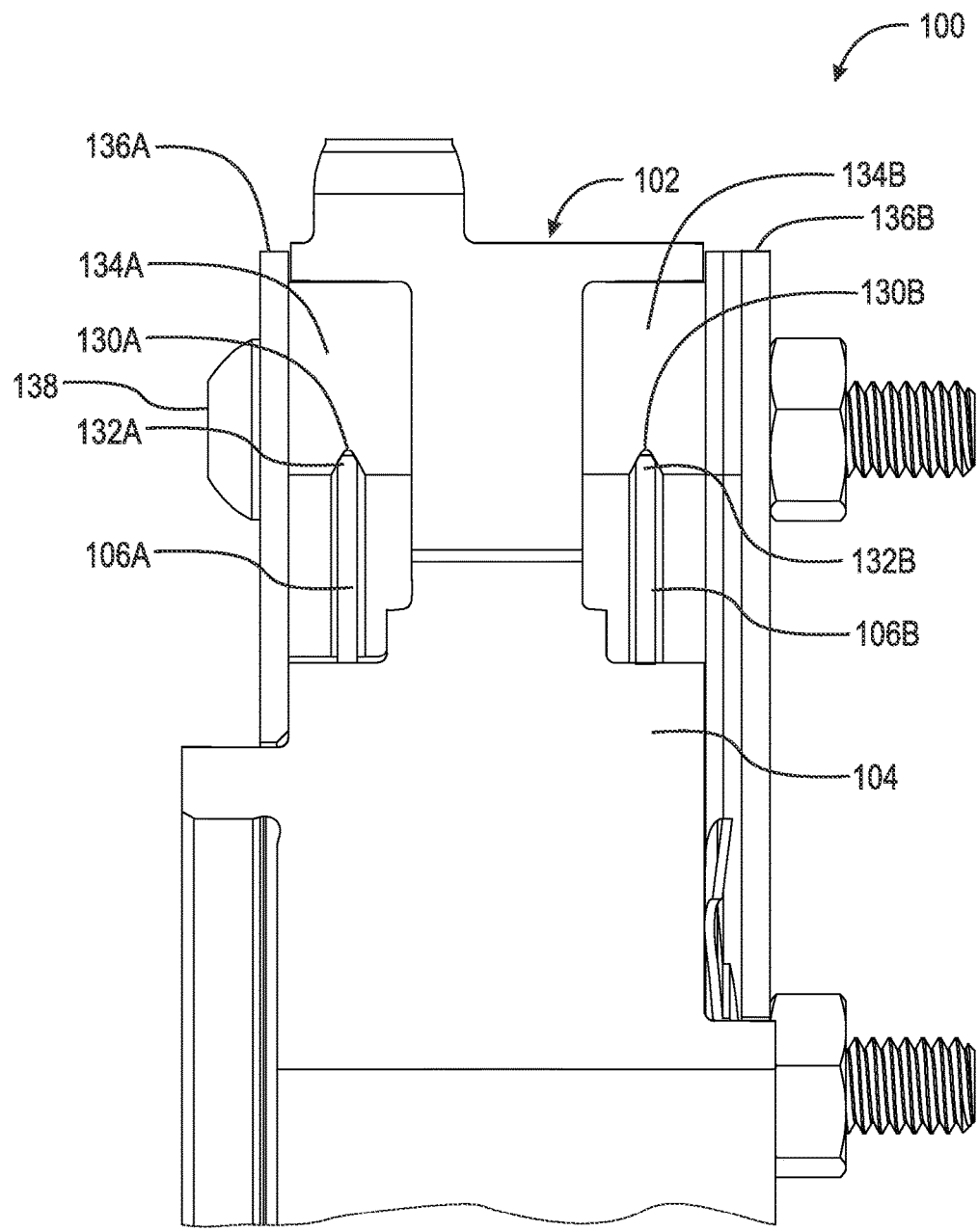
FIG. 11 is a cross-sectional view generally along line 11-11 in FIG. 3.

FIG. 11 is a cross-sectional view generally along line 11-11 in FIG. 3 with side plates added. The following should be viewed in light of FIGS. 2 through 11. In an example embodiment, phaser 100 includes circumferentially disposed grooves 130A and 130B and wedge plates 106A and 106B include chamfered radially outer portions 132A and 132B. In an example embodiment, phaser 100 includes groove plates 134A and 134B with grooves 130A and 130B, respectively. Plates 134A and 134B are fixedly connected to stator 102, for example by side plates 136A and 136B, respectively, and bolts 138. In an example embodiment (not shown), grooves 130A and 130B are formed directly in stator 102. Portions 132A and 132B are frictionally engaged with grooves 130A and 130B so that wedge plates 106A and 106B rotate with stator 102 except as noted above and below. As wedge plate 106A is displaced radially outward as described above, portion 132A compressively engages groove 130A, non-rotatably connecting stator 102 and wedge plate 106A. As wedge plate 106B is displaced radially outward as described above, portion 132B compressively engages groove 130B, non-rotatably connecting stator 102 and wedge plate 106B.

Figure 12:
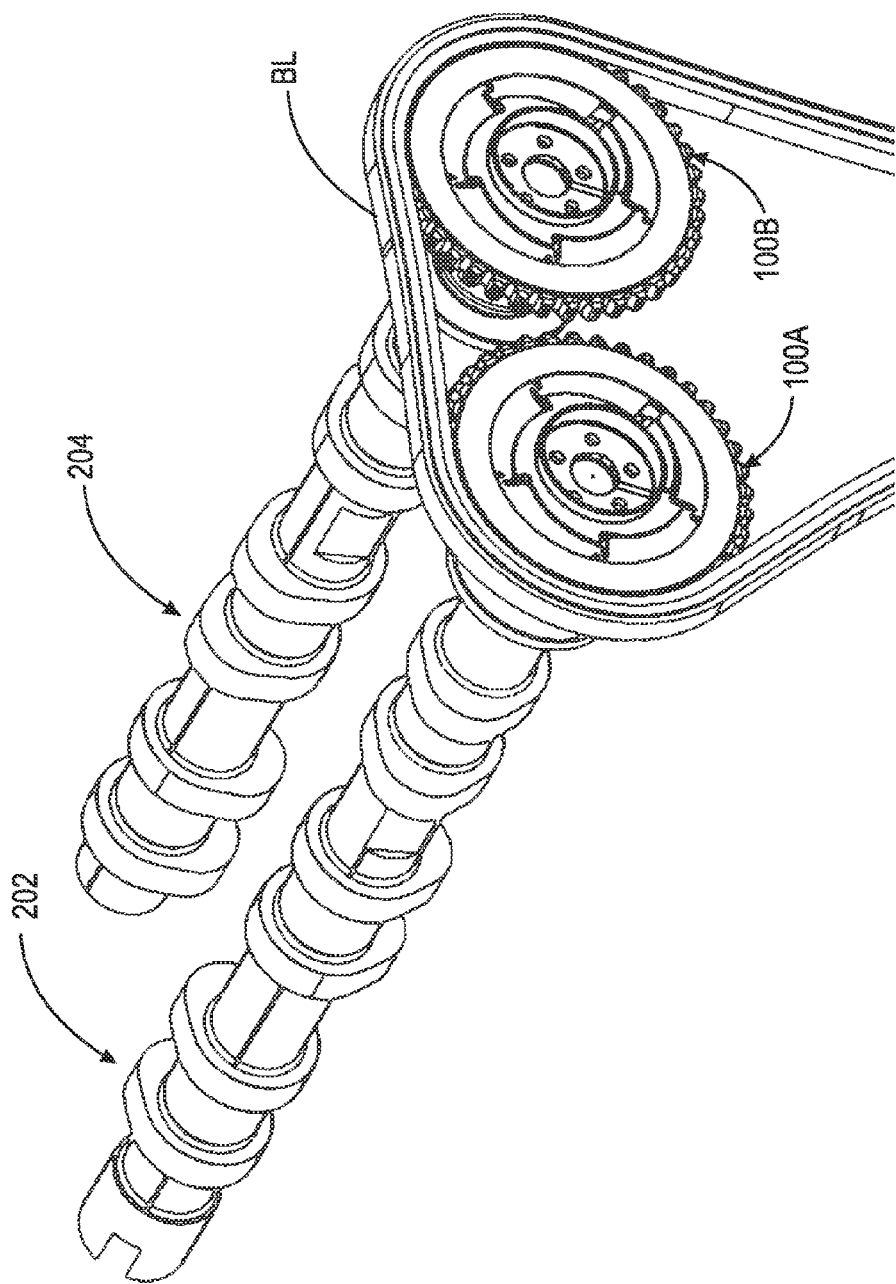
FIG. 12 is a perspective view of camshaft phasers connected to respective cam shafts; and,
FIG. 13 is a perspective exploded view of a camshaft phaser with two-way wedge clutches and radially displacing pins.

FIG. 12 is a perspective view of camshaft phasers 100A and 100B connected to cam shafts 202 and 204, respectively. The discussion regarding phaser 100 is applicable to phasers 100A and 100B. Typically, one of cam shafts 202 and 204 is for an intake valve train and the other of cam shafts 202 and 204 is for an exhaust valve train. Phasers 100A and 100B are rotated by chain (simplified chain model—chain sprockets are shown) BL, typically driven by a crankshaft for an engine of which the camshafts and phasers are a part. The following discussion is directed to phaser 100A; however, it should be understood that the discussion is applicable to phaser 100B as well.

In the discussion that follows, stator 102 rotates in direction CD1 in response to torque from chain BL. As is known in the art, torsional forces T1 and T2 are transmitted from camshaft 202, in directions CD1 and CD2, respectively, to rotor 104 during operation of phaser 100. The torsional force forces are due to interaction of cam lobes (not shown) on camshaft 202 with various components of a valve train (not shown) of which camshaft 202 is a part. Torsional forces T1 and T2 are transmitted in a repeating cycle. Rotor 104 rotates in direction CD1; however, torsional force T1 urges rotor 104 in direction CD1 with respect to the stator and torsional force T2 urges rotor 104 in direction CD2 with respect to the stator.

Phaser 100A is configured to operate in at least three modes: a drive mode; the advance mode; and the retard mode. In the drive mode, the stator receives rotational torque T1 from chain or belt BL, for example in direction CD1. In drive mode, pressurized fluid is not supplied to chambers 124A and 124B. Resilient elements 118A and 118B urge ends E1 and E3, respectively, in circumferential direction CD2 and circumferential direction CD1, respectively. Since there is no fluid pressure in chambers 124A and 124B, the urging of resilient elements 118A and 118B is not resisted by pins 122A and 122B. As a result: ramps 110 slide along ramps 116 causing wedge plate 106A to displace radially outward to non-rotatably connect rotor 104, wedge plate 106A, and stator 102; and ramps 114 slide along ramps 118 causing wedge plate 106B to displace radially outward to non-rotatably connect rotor 104, wedge plate 106B, and stator 102. Thus, rotation of rotor 104 is locked to rotation of stator 102 and torque T1 is transmitted to rotor 104.

The following describes the advance mode. Assume stator 102 is rotating in direction CD1 and phaser 100A receives torsional force T1. Fluid PF in channel 128A urges pin 122A in direction CD1 to displace wedge plate 106A is direction CD1. Ramps 110 slide down ramps 114, and rotor 104 displaces distance 142A in direction CD1. At the same time, the rotation of rotor 104 causes ramps 112 to slide down ramps 116, that is, wedge plate 106B does not block the rotation of the rotor.

The rotor then receives torque T2 to initiate the second phase and the pressurized fluid is drained from channel 128A. Torque T2 on rotor 104 urges the rotor in direction CD2. At the same time, wedge plate 106B is urged in direction CD1 by resilient element 118B. As a result, as soon as the rotor receives torque T2, ramps 116 slide up ramps 112 to non-rotatably connect the rotor and the stator. That is, resilient element 118B eliminates backlash in the transition from torque T1 to torque T2. Thus, rotor 104 is prevented from rotating back in direction CD2, which would cancel the displacement in distance 142A. Therefore, in the advance mode, for each cycle of torques T1 and T2, rotor 104 rotates distance 142A in direction CD1. For successive cycles of T1 and T2 in the advance mode, rotor 104 displaces distance 142A, with respect to stator 102, in direction CD1. That is, this process is repeatable via successive cycles of torsional forces T1 and T2 to attain a desired shift of rotor 104.

The following describes the retard mode. Assume stator 102 is rotating in direction CD1 and phaser 100A receives torsional force T2. Fluid PF in channel 128B urges pin 122B in direction CD2 to displace wedge plate 106B is direction CD2. Ramps 112 slide down ramps 116, and rotor 104 displaces distance 142B in direction CD2. At the same time, the rotation of rotor 104 causes ramps 110 to slide down ramps 114, that is, wedge plate 106A does not block the rotation of the rotor.

The rotor then receives torque T1 to initiate the first phase and the pressurized fluid is drained from channel 128B. Torque T1 on rotor 104 urges the rotor in direction CD1. At the same time, wedge plate 106A is urged in direction CD2 by resilient element 118A. As a result, as soon as the rotor receives torque T1, ramps 114 slide up ramps 110 to non-rotatably connect the rotor and the stator. That is, resilient element 118A eliminates backlash in the transition from torque T2 to torque T1. Thus, rotor 104 is prevented from rotating back in direction CD1, which would cancel the displacement in distance 142B. Therefore, in the advance mode, for each cycle of torques T1 and T2, rotor 104 rotates distance 142B in direction CD2. For successive cycles of T1 and T2 in the advance mode, rotor 104 displaces distance 142B, with respect to stator 102, in direction CD2. That is, this process is repeatable via successive cycles of torsional forces T1 and T2 to attain a desired shift of rotor 104.

Each distance 142A is a result of phaser 100A implementing a full cycle of torsional force forces T1 and T2. To shift rotor 104 in direction CD1 by distance 144A, less than distance 142A, pressurized fluid PF is drained from channel 128A after rotor 104 has begun rotation in direction CD1 (by distance 144A) but before rotor 104 has rotated distance 142A.

Each distance 142B is a result of phaser 100A implementing a full cycle of torsional force forces T1 and T2. To shift rotor 104 in direction CD2 by distance 144B, less than distance 142B, pressurized fluid PF is drained from channel 128B after rotor 104 has begun rotation in direction CD2 (by distance 144B), but before rotor 104 has rotated distance 142B.

Thus, rotor 104 can be controllably and repeatably rotated virtually any amount with respect to stator 102 in the advance and retard modes.

The following should be viewed in light of FIGS. 2 through 12. The following describes a method for fabricating a camshaft phaser. Although the method is presented as a sequence of steps for clarity, no order should be inferred from the sequence unless explicitly stated. A first step fabricates a rotor including: a core portion; a central opening through which an axis of rotation for the camshaft phaser passes; first and second chambers; a first channel connecting the central opening and the first chamber; and a second channel connecting the central opening and the second chamber. A second step installs a first pin in the first chamber. A third step installs a second pin in the second chamber. A fourth step installs a first wedge plate, including a third plurality of ramps, radially about the rotor. A fifth step engages the first plurality of ramps with the third plurality of ramps. A sixth step installs a first resilient element between a first circumferential end of the first wedge plate and the rotor, the first resilient element urging the first wedge plate in a first circumferential direction. A seventh step places a second circumferential end of the first wedge plate proximate the first pin. An eighth step installs a second wedge plate, including a fourth plurality of ramps, radially about the rotor. A ninth step engages the second plurality of ramps with the fourth plurality of ramps. A tenth step installs a second resilient element between a third circumferential end of the second wedge plate and the rotor, the second resilient element urging the second wedge plate in a second circumferential direction opposite the first circumferential direction. An eleventh step places a fourth circumferential end of the second wedge plate proximate the second pin. A twelfth step installs the rotor and the first and second wedge plates in the stator.

Figure 13:
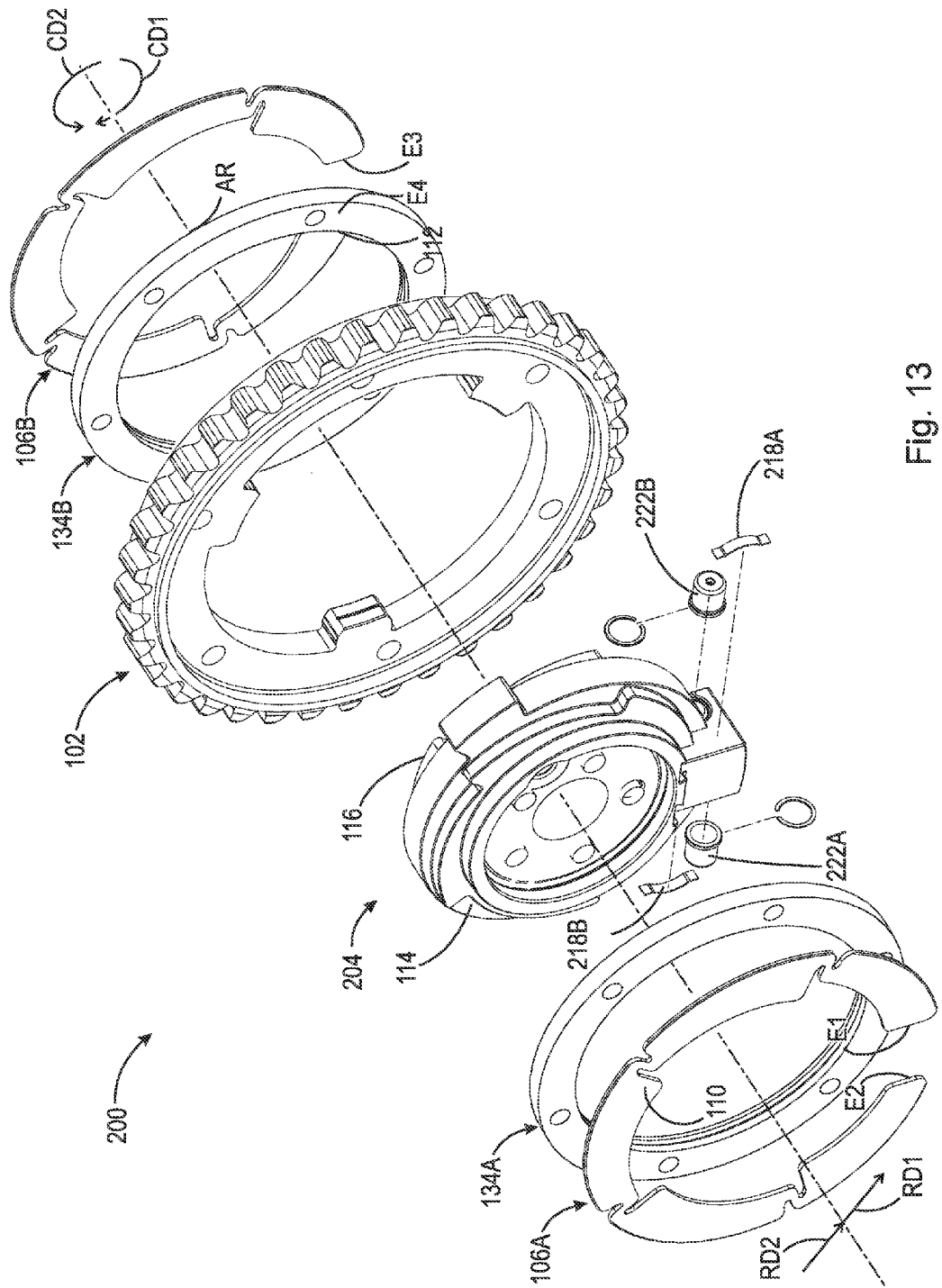

FIG. 13 is a perspective exploded view of camshaft phaser 200 with two-way wedge clutches and circumferentially displacing pins. The discussion of camshaft phaser 100 in FIGS. 2 through 12 is applicable to camshaft phaser 200 except as follows. Elements 218A and 218B perform the same functions as elements 118A and 118B. Pins 222A and 222B displace in circumferential directions CD2 and CD1, respectively, in response to pressurized fluid. The operations associated with displacement of pin 122A in direction RD1 are accomplished by displacement of pin 222A in direction CD2 to contact end E1 in FIG. 13. The operations associated with displacement of pin 122B in direction RD1 are accomplished by displacement of pin 222B in direction CD1 to contact end E3 in FIG. 13.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:
1. A camshaft phaser, comprising:
a stator arranged to receive torque from an engine;
a rotor arranged to be non-rotatably connected to a camshaft;
first and second wedge plates radially disposed between the rotor and the stator; and,
a displacement assembly arranged to:
for an advance mode, displace the first wedge plate in a first circumferential direction to enable rotation of the rotor, with respect to the stator, in the first circumferential direction; and,
for a retard mode, displace the second wedge plate in a second circumferential direction, opposite the first circumferential direction, to enable rotation of the rotor, with respect to the stator, in the second circumferential direction.

2. The camshaft phaser of claim 1, wherein:
for the advance mode, the displacement assembly is arranged to displace the second wedge plate in the first circumferential direction to block rotation of the rotor, with respect to the stator, in the second circumferential direction; and,
for the retard mode, the displacement assembly is arranged to displace the first wedge plate in the second circumferential direction to block rotation of the rotor, with respect to the stator, in the first circumferential direction.

3. The camshaft phaser of claim 2, wherein:
to block rotation of the rotor, with respect to the stator, in the second circumferential direction, the displacement assembly is arranged to non-rotatably connect the rotor, the second wedge plate, and the stator; and,
to block rotation of the rotor, with respect to the stator, in the first circumferential direction, the displacement assembly is arranged to non-rotatably connect the rotor, the first wedge plate, and the stator.

4. The camshaft phaser of claim 1, wherein:
the rotor includes first and second pluralities of ramps, respectively;
the first and second wedge plates include third and fourth pluralities of ramps engaged with the third and fourth pluralities of ramps, respectively;
for the advance mode:
    the first plurality of ramps are arranged to slide along the third plurality of ramps in the first circumferential direction; and,
    the displacement assembly is arranged to slide the fourth plurality of ramps along the second plurality of ramps in the first circumferential direction; and,
for the retard mode:
    the second plurality of ramps are arranged to slide along the fourth plurality of ramps in the second circumferential direction; and,
    the displacement assembly is arranged to slide the third plurality of ramps along the first plurality of ramps in the second circumferential direction.

5. The camshaft phaser of claim 4, further comprising:
first and second circumferentially disposed grooves fixed with respect to the stator;
the first and second wedge plates include first and second chamfered radially outer portions, respectively;
sliding the fourth plurality of ramps along the second plurality of ramps is arranged to displace the second wedge plate radially outward to frictionally engage the second chamfered radially outer portion with the second groove; and,
sliding the third plurality of ramps along the first plurality of ramps is arranged to displace the first wedge plate radially outward to frictionally engage the first chamfered radially outer portion with the first groove.

6. The camshaft phaser of claim 1, wherein the displacement assembly includes:
a first resilient element arranged to displace the first wedge plate in the second circumferential direction; and,
a second resilient element arranged to displace the second wedge plate in the first circumferential direction.

7. The camshaft phaser of claim 6, wherein:
for the advance mode, the second resilient element is arranged to displace the second wedge plate in the first circumferential direction to block rotation of the rotor, with respect to the stator, in the second circumferential direction; and,
for the retard mode, the first resilient element is arranged to displace the first wedge plate in the second circumferential direction to block rotation of the rotor, with respect to the stator, in the first circumferential direction.

8. The camshaft phaser of claim 7, wherein:
the first wedge plate includes first and second circumferential ends separated by a first gap in the first circumferential direction;
the second wedge plate includes third and fourth circumferential ends separated by a second gap in the first circumferential direction; and,
the first and second resilient elements are engaged with the first and third circumferential ends, respectively.

9. The camshaft phaser of claim 1, wherein:
the displacement assembly includes first and second pins partially disposed in first and second chambers, respectively, in the rotor;
for the advance mode, the displacement assembly is arranged to displace the first pin to contact and displace the first wedge plate in the first circumferential direction; and,
for the retard mode, the displacement assembly is arranged to displace the second pin to contact and displace the second wedge plate in the second circumferential direction.

10. The camshaft phaser of claim 9, wherein:
the first wedge plate includes first and second circumferential ends separated by a first gap in the first circumferential direction;
the second wedge plate includes third and fourth circumferential ends separated by a second gap in the first circumferential direction; and,
the first and second pins are arranged to engage the first and third circumferential ends, respectively.

11. The camshaft phaser of claim 10, wherein:
the first circumferential end includes a first slope in the second circumferential direction along a radially outward direction;
the second circumferential end includes a second slope in the first circumferential direction along the radially outward direction;
in the advance mode, the first pin slides along the first slope; and,
in the retard mode, the second pin slides along the second slope.

12. The camshaft phaser of claim 9, wherein:
the rotor includes a central opening through which an axis of rotation for the camshaft phaser passes; and,
the displacement assembly includes:
    a first channel:
        connecting the central opening and the first chamber; and,
        arranged to receive pressurized fluid to displace the first pin in the first circumferential direction; and,
    a second channel:
        connecting the central opening and the second chamber; and,
        arranged to receive pressurized fluid to displace the second pin in the second circumferential direction.

13. The camshaft phaser of claim 1, wherein:
the rotor is arranged to receive a plurality of torque cycles from the camshaft;
each torque cycle included in the plurality of torque cycles includes a first torque in the first circumferential direction followed by a second torque in the second circumferential direction;
in the advance mode, for a first torque cycle included in the plurality of torque cycles:
    the stator is arranged to rotate in the first circumferential direction;
    the rotor is arranged to receive the first and second torques;

the rotor is arranged to rotate, with respect to the stator, a first distance in the first circumferential direction; and, the second wedge plate is arranged to block rotation of the rotor, with respect to the stator, in the second circumferential direction; and, in the retard mode, for a second torque cycle included in the plurality of torque cycles:

the stator is arranged to rotate in the first circumferential direction;

the rotor is arranged to receive the first and second torques;

the rotor is arranged to rotate, with respect to the stator, a second distance in the second circumferential direction; and, the first wedge plate is arranged to block rotation of the rotor, with respect to the stator, in the first circumferential direction.

14. The camshaft phaser of claim 13, wherein:

in the advance mode, for a third torque cycle included in the plurality of torque cycles, the first resilient element is arranged to displace the first wedge plate in the second circumferential direction to block rotation of the rotor, with respect to the stator in the first circumferential direction, after the rotor has begun rotating in the first circumferential direction before the rotor has rotated the first distance in the first circumferential direction; or, in the retard mode, for a transition from a third torque cycle included in the plurality of torque cycles to a fourth torque cycle included in the plurality of torque cycles, the second resilient element is arranged to displace the second wedge plate in the first circumferential direction to block rotation of the rotor, with respect to the stator in the second circumferential direction, after the rotor has begun rotating in the second circumferential direction before the rotor has rotated the second distance in the second circumferential direction.

15. The camshaft phaser of claim 1, wherein for a drive mode in which rotation of the rotor is locked to rotation of the stator, the displacement assembly is arranged to:

displace the second wedge plate in the first circumferential direction to block rotation of the rotor, with respect to the stator, in the second circumferential direction; and, displace the first wedge plate in the second circumferential direction to block rotation of the rotor, with respect to the stator, in the first circumferential direction.

16. A camshaft phaser, comprising:

a stator arranged to receive torque from an engine;

a rotor arranged to be non-rotatably connected to a camshaft;

first and second wedge plates radially disposed between the rotor and the stator; and, a displacement assembly including:

a first and second resilient elements; and, first and second pins, wherein:

for an advance mode:

the second resilient element is arranged to displace the second wedge plate in a first circumferential direction to block rotation of the rotor, with respect to the stator, in a second circumferential direction, opposite the first circumferential direction; and, the first pin is arranged a displace the first wedge plate in the first circumferential direction to enable rotation of the rotor, with respect to the stator, in the first circumferential direction; and, for a retard mode:

the second resilient element is arranged to displace the first wedge plate in the second circumferential direction to block rotation of the rotor, with respect to the stator, in the first circumferential direction; and, the second pin is arranged to displace the second wedge plate in the second circumferential direction to enable rotation of the rotor, with respect to the stator, in the second circumferential direction.

17. The camshaft phaser of claim 16, wherein:

the first wedge plate includes first and second circumferential ends separated by a first gap in the first circumferential direction;

the second wedge plate includes third and fourth circumferential ends separated by a second gap in the first circumferential direction;

the first and second resilient elements are engaged with the first and third circumferential ends, respectively;

for the advance mode, the first pin is arranged to contact the second circumferential end; and, for the retard mode, the second pin is arranged to contact the fourth circumferential end.

18. The camshaft phaser of claim 17, wherein:

the first circumferential end includes a first slope in the second circumferential direction along a radially outward direction;

the second circumferential end includes a second slope in the first circumferential direction along the radially outward direction;

in the advance mode, the first pin slides radially outward along the first slope; and, in the retard mode, the second pin slides radially outward along the second slope.

19. The camshaft phaser of claim 16, wherein:

the rotor is arranged to receive a plurality of torque cycles from the camshaft;

each torque cycle included in the plurality of torque cycles includes a first torque in the first circumferential direction followed by a second torque in the second circumferential direction;

in the advance mode, for a first torque cycle included in the plurality of torque cycles:

the stator is arranged to rotate in the first circumferential direction;

the rotor is arranged to receive the first and second torques;

the rotor is arranged to rotate, with respect to the stator, a first distance in the first circumferential direction; and, the second wedge plate is arranged to block rotation of the rotor, with respect to the stator, in the second circumferential direction; and, in the retard mode, for a second torque cycle included in the plurality of torque cycles:

the stator is arranged to rotate in the first circumferential direction;

the rotor is arranged to receive the first and second torques;

the rotor is arranged to rotate, with respect to the stator, a second distance in the second circumferential direction; and, the first wedge plate is arranged to block rotation of the rotor, with respect to the stator, in the first circumferential direction.

20. A camshaft phaser, comprising:
a stator arranged to receive torque from an engine;
a rotor arranged to be non-rotatably connected to a camshaft;
first and second wedge plates radially disposed between the rotor and the stator; and,
a displacement assembly arranged to:
  for an advance mode, displace the first wedge plate in a first circumferential direction to enable rotation of the rotor, with respect to the stator, in the first circumferential direction; and,
  for a retard mode, displace the second wedge plate in a second circumferential direction, opposite the first circumferential direction, to enable rotation of the rotor, with respect to the stator, in the second circumferential direction, wherein a portion of the stator is axially disposed between the first and second wedge plates.

* * * * *